E. JOHNSON.
Process and Apparatus for Making Paper-Pulp from Wood, &c.

No. 212,232. Patented Feb. 11, 1879.

2 Sheets—Sheet 1.

Witnesses:
Fred. G. Dietrich.
Chas. R. Searle.

Inventor:
Elmore Johnson,
By his atty,
J. S. Brown.

E. JOHNSON.
Process and Apparatus for Making Paper-Pulp from Wood, &c.
No. 212,232.  Patented Feb. 11, 1879.
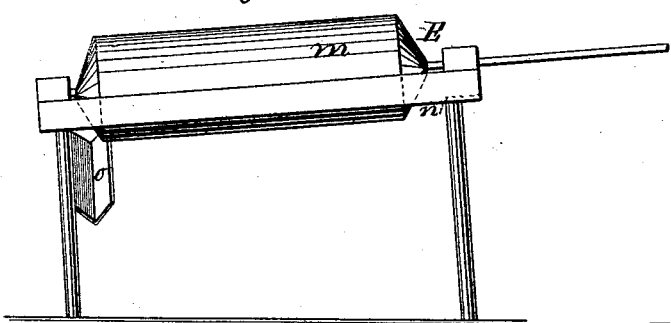
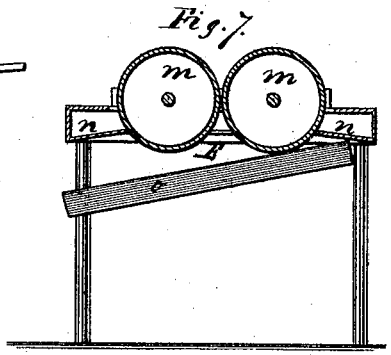
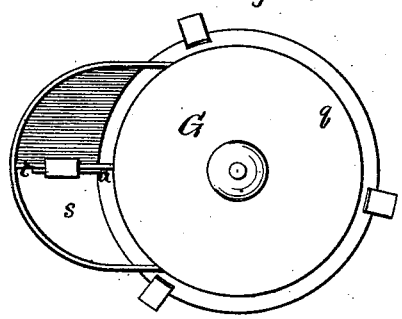
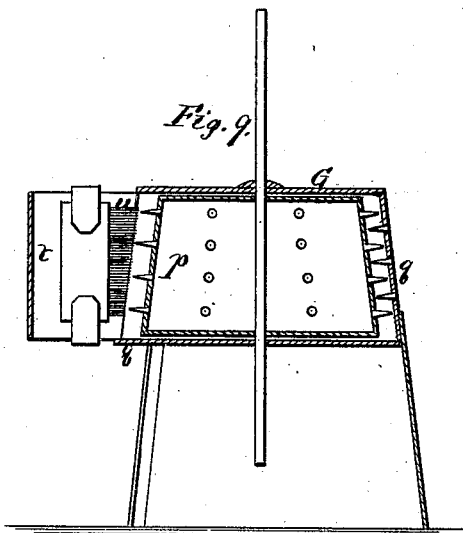
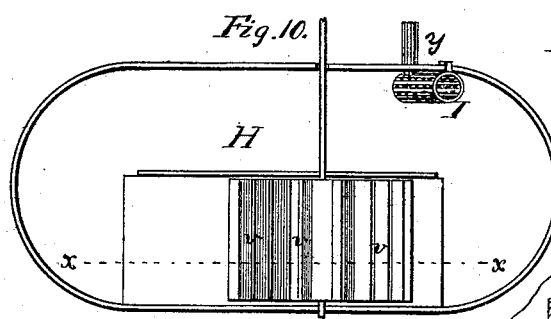
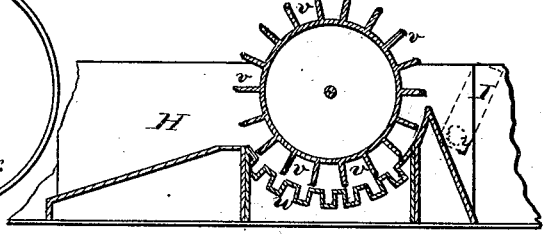
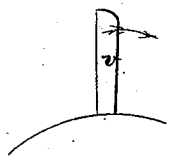

UNITED STATES PATENT OFFICE.

ELMORE JOHNSON, OF MORRISVILLE, VERMONT.

IMPROVEMENT IN PROCESSES AND APPARATUS FOR MAKING PAPER-PULP FROM WOOD, &c.

Specification forming part of Letters Patent No. 212,232, dated February 11, 1879; application filed July 30, 1878.

*To all whom it may concern:*

Be it known that I, ELMORE JOHNSON, of Morrisville, in the county of Lamoille and State of Vermont, have invented an Improved Process and Apparatus for Making Paper-Pulp from Wood and other vegetable substances; and I do hereby declare that the following is a full and exact description thereof, reference being had to the accompanying drawings, making part of this specification.

Figure 1:
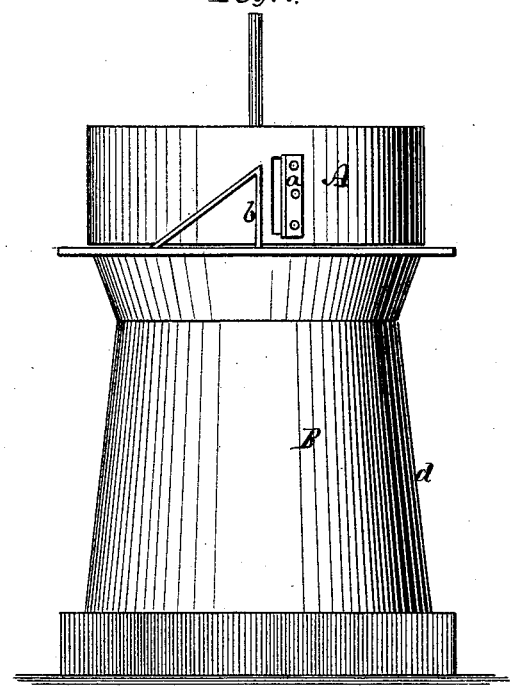
Figure 2:
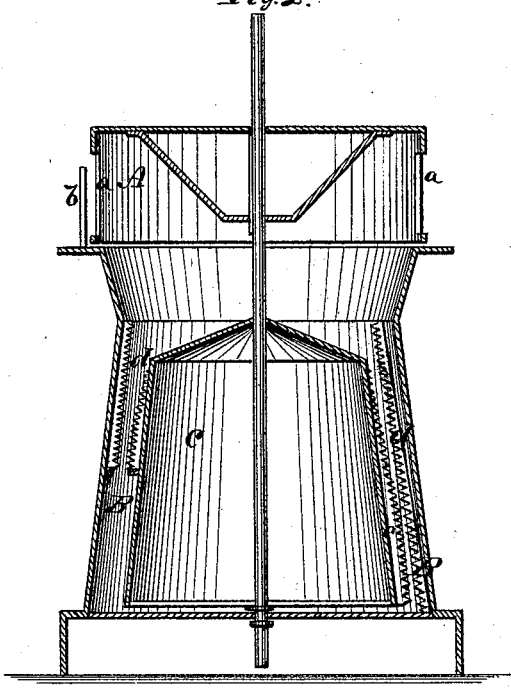
Figure 3:
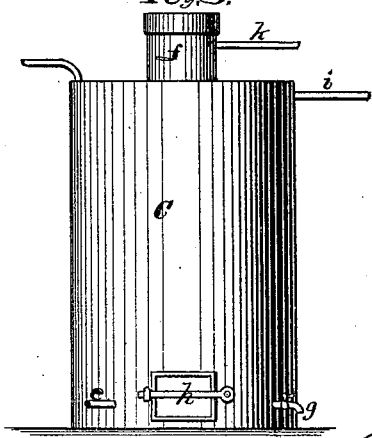
Figure 4:
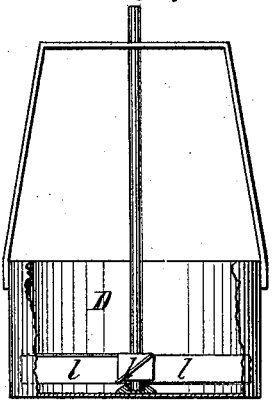
Figure 5:
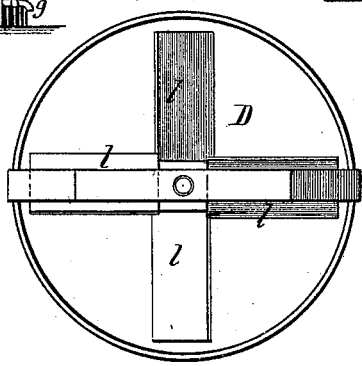

Figure 1 is a side view of the cutter-wheel and crusher combined, forming part of the improved apparatus employed by me in this invention; Fig. 2, a central vertical section of the same; Fig. 3, a side view of the cooking-tank or digester; Fig. 4, a side view of the washer; Fig. 5, a top view of the same; Fig. 6, a side view of the wringer; Fig. 7, a transverse vertical section of the same; Fig. 8, a top view of the picker, the top-plate thereof being removed; Fig. 9, a central vertical section of the same; Fig. 10, a top view of the pulping-engine; Fig. 11, a vertical section thereof in a plane indicated by the line $x\ x$, Fig. 10; Fig. 12, view of a part detached.

Like letters designate corresponding parts in all of the figures.

The nature of my invention consists in the treatment of wood and other vegetable fiber with a combination of mechanical appliances, some of them being peculiarly constructed, the process also including some chemical treatment, by which apparatus and process I not only reduce the stock to the requisite or desired fineness, but retain a length of fiber, which renders it very desirable stock for the manufacture of the various kinds of paper which the market demands, the process and apparatus being substantially as hereinafter specified.

I shall herein describe the process for the treatment of wood or similar vegetable fiber in the manufacture of paper-stock, it being especially adapted to the pulping of this material.

The wood is first cut into suitable lengths to be easily handled, and is prepared for this use by removing all discolored and decayed parts, knots, and bark.

The first treatment in the process to which the wood is subjected is to cut it across the grain into chips of the desired thickness to produce strong-fibered paper—say, three-eighths of an inch, more or less. This cutting I effect by means of a cutter wheel or head, A, Fig. 1, there being one, two, or more knives or cutters, $a\ a$, set in its periphery to cut off the wood fed up to it and held against a rest, $b$, outside of the cutter-wheel. This wheel is hollow, and the chips, as fast as cut off, fall into the inside thereof.

Immediately below the cutter-wheel A is located a crusher, B, which may have any suitable construction. As represented, it consists of a revolving cone, $c$, with vertical, or, preferably, spiral, rows of teeth on its periphery, and a case, $d$, around it of similar form, and having similar rows of teeth on its inner surface, the degree of spirality preferably being different from that of the teeth on the cone. As the cone revolves the chips are caught between the revolving and stationary teeth, and thereby split into small pieces.

The cone may be adjustable up and down in the case, to vary the distance between its teeth and those of the surrounding case, and thereby regulate the degree of fineness to which the wood is reduced thereby.

The crusher-cone is on the same shaft as the cutter-wheel A above, so that the cuttings or chips drop automatically from the interior of the wheel into the crusher, and neither is clogged, and no labor or time is required to transfer the chips from one to the other. Thus economy of time and room, as well as of construction and of shafting and belting to drive the machines, is effected.

After the stock is discharged from the crusher B it is conveyed or falls into the cooking-tank or digester C, which is a close vessel to contain a certain quantity of the stock at each charge, and to contain a digesting-liquid composed of lime, lye of wood-ashes, or their equivalent, and water. To make it, take about seventy pounds of unslaked lime, one-half pailful of lye from a leach-tub, and sufficient water in which to digest the stock produced from one cord of wood. The vessel is provided with a steam-pipe, $e$, for admitting steam from a boiler at a pressure of ten or twelve pounds to the square inch therein, with a comparatively narrow neck, $f$, at the top, through which the stock is introduced, with a discharge-pipe, *g*, to draw off the liquid of the digesting-bath, and with a discharge-opening covered with a plate or door, *h*, through which to draw out the stock when sufficiently treated. It also has a pipe, *i*, leading from near the top to a situation outside of or under the building, through which any surplus water accumulating in the digester from the condensation of the steam, or otherwise, may be discharged.

All of the above-named parts may be of ordinary construction; but I add, as an improvement, which experience and practice have shown me to be of need and value, consisting of another pipe, *k*, for the discharge of surplus water and steam, leading from the neck *f* or feeding-tube of the digester.

The stock, especially when first introduced into the digester, is lighter than the liquid, and floats, or tends to float, therein, and thereby chokes the outlet-pipe *i* at the top, so that there cannot be a free discharge of accumulated water and surplus steam, which produces too much pressure in the digester. To obviate this I place the additional pipe *k* above where the stock rises, since it does not rise into the narrow neck *f* to clog it, so that the surplus of steam and water can at any time be discharged, and thus the pressure in the digester can at all times be kept uniform, which is very desirable. These discharge-pipes may be controlled by stop-cocks, and the neck of the digester may be closed at the top during the digesting process, which is continued for about forty hours.

After the stock is withdrawn from the digester it is put in a washer, D, and repeatedly washed in renewed waters until all alkaline and other impurities are separated from the stock. This washer is of no special construction, being represented as a tub, with revolving arms or rubbers *l l* near the bottom thereof. From the washer the stock is then discharged into a wringer, E, which consists of a pair of squeezing-rollers, *m m*, caused to revolve toward each other by suitable belting and gearing, of troughs *n n* in the frame below the rollers and reaching inward close to them, and of a spout, *o*, at one end to catch and convey away the water as it is expressed from the stock by the rollers. The rollers have conical ends, so as to bring the dripping surfaces away from the frame and induce the collection of the water in the troughs; and one end of the rollers overhanging the spout *o* is lower than the other end, so that the water nearly all runs to that end and falls directly into the spout.

As soon as the stock has been passed through the above-described wringer it is dry enough to be at once subjected to the action of a picker, G, which is of peculiar construction, substantially as follows: The picker has a revolving cone, *p*, or burr of equivalent form, turning on a vertical axis inside of a case, *q*, of corresponding form. The cone has vertical rows of pointed teeth at intervals around its periphery, and the case has vertical rows of pointed teeth at intervals around its inner surface, the teeth of the cone as it revolves passing between the teeth of the stationary case. The stock is introduced in a receiver or hopper, *r*, projecting from one side of the case, and opening to the revolving cone, which catches the stock a little at a time, and carries it around in the case, thereby picking it into fine shreds or fibrous particles. It is discharged through a compartment or spout, *s*, projecting also from the periphery of the case *q*, and only separated from the receiver *r* by a radial partition, *t*, near the inner edge of which is located a brush, *u*, of wire, or its equivalent, the ends of the brush-wire projecting toward the revolving cone, so that the teeth thereof nearly touch it, the brush being adjustable toward and from the same. This brush serves to clear the stock fibers from the teeth of the cone, and cause the same to be discharged more completely, quickly, and uniformly than a straight-edged partition would do, and thus the stock is not overworked, and much more is passed through the picker in a given time than could otherwise be done. It may be passed through one or more such pickers, which may reduce it successively to greater fineness without injury to the fiber.

The stock is then transferred to the pulping-engine H, which also has some peculiarities of construction. The blades *v v* of the revolving wheel have their forward edges rounded or beveled, as shown in Figs. 11 and 12. Those acting upon the stock over the bed *w*, beneath, cause the same to be smoothly rubbed, crushing and reducing the same, but not cutting the fibers, as sharp edges would do, whereby a longer, stronger, better fiber is obtained.

In the vat of the engine I locate a washer or strainer, I, constructed as a hollow cylinder or case, of wire-cloth or perforated sheet metal, to be connected with a discharge-pipe, *y*, with a stop-valve, and conducting out of the mill. Through this strainer the water in the engine, when impure, is drawn off, the pulp being retained thereby. It is removable and attachable at will.

All the different machines or parts of the apparatus may be arranged and connected together by conductors, so that the stock will either pass automatically from one to the next in order, or will be very easily, conveniently, or quickly transferred from one to another. Where practicable, the first machine used in the process should be highest in position, and the successive machines be placed lower than the preceding, down to the last.

What I claim as my invention, and desire to secure by Letters Patent, is—

1. In the process of reducing wood and other fibrous substances to paper-pulp, the successive operations, as follows: first, to cut the wood into chips of definite grain length; then crush the chips or sections into small pieces; then digest the stock in a bath composed of quicklime, lye of wood-ashes, or the equivalent thereof, and water, with steam at a suitable pressure at the boiler; then, after washing and wringing the stock, submit the softened fibers to a picker or pickers of intermeshing pointed teeth; and, finally, to a smooth rubbing or crushing action in a pulping-engine, substantially as and for the purpose herein specified.

2. In a combined apparatus for reducing wood to paper-pulp, a hollow cutter-wheel, A, constructed to receive the chips cut from the wood into the interior of the same, and to deliver them to the crusher below, substantially as and for the purpose herein specified.

3. A cutter-wheel, A, and crusher-cone, B, arranged one below the other, to revolve with the same shaft, substantially as and for the purpose herein specified.

4. A digester, C, provided with an additional discharge-pipe, $i$, for the surplus steam and water, extending from the narrow feeding-neck $f$ of the same, substantially as and for the purpose herein specified.

5. A wringer, E, provided with inclined squeezing-rollers $m$ $m$, with conical ends, substantially as and for the purpose herein specified.

6. A wringer, E, provided with side troughs $n$ $n$ and discharge-spout $o$, surrounding the squeezing-rollers $m$ $m$, substantially as and for the purpose herein specified.

7. A picker, G, having a receiver or feeder, $r$, and discharger $s$, adjacent to each other, and separated by a simple partition, $t$, substantially as and for the purpose herein specified.

8. A picker, G, having a brush, $u$, between the discharge-opening and the feed-opening, substantially as and for the purpose herein specified.

9. Blades $v$ $v$ on the revolving wheel of the pulping-engine, each formed with a beveled or rounded edge at the forward corner, substantially as and for the purpose herein specified.

10. A water-discharge strainer, I, in the pulping-engine, formed of wire-cloth or perforated sheet metal, substantially as and for the purpose herein specified.

ELMORE JOHNSON.

Witnesses:
   H. P. WAKEFIELD,
   ORLO CADY.